(12) United States Patent
Wan et al.

(10) Patent No.: US 12,146,772 B2
(45) Date of Patent: Nov. 19, 2024

(54) LASER RANGING DEVICE AND AUTOMATIC CLEANING DEVICE

(71) Applicants: XIAOMI INC., Beijing (CN); BEIJING ROCKROBO TECHNOLOGY CO., LTD., Beijing (CN)

(72) Inventors: Yunpeng Wan, Beijing (CN); Yongfeng Xia, Beijing (CN)

(73) Assignees: XIAOMI INC., Beijing (CN); BEIJING ROCKROBO TECHNOLOGY CO., LTD., Beijing (CN)

( * ) Notice: Subject to any disclaimer, the term of this patent is extended or adjusted under 35 U.S.C. 154(b) by 1003 days.

(21) Appl. No.: 17/129,844

(22) Filed: Dec. 21, 2020

(65) Prior Publication Data
US 2021/0108946 A1 Apr. 15, 2021

Related U.S. Application Data

(63) Continuation of application No. 16/023,178, filed on Jun. 29, 2018, now Pat. No. 10,900,816, which is a
(Continued)

(51) Int. Cl.
*G01S 17/08* (2006.01)
*A47L 11/24* (2006.01)
(Continued)

(52) U.S. Cl.
CPC .............. *G01D 5/347* (2013.01); *A47L 11/24* (2013.01); *G01S 7/48* (2013.01); *G01S 17/08* (2013.01); *G01S 17/48* (2013.01); *A47L 2201/04* (2013.01)

(58) Field of Classification Search
None
See application file for complete search history.

(56) References Cited

U.S. PATENT DOCUMENTS

| 2015/0143646 A1* | 5/2015 | Jeong | A47L 11/4038 15/98 |
| 2015/0241195 A1* | 8/2015 | Schenkewitz | H03K 17/962 264/255 |

(Continued)

FOREIGN PATENT DOCUMENTS

| CN | 201058001 Y | * | 5/2008 | |
| CN | 105182352 A | * | 12/2015 | |
| WO | WO-2015074594 A1 | * | 5/2015 | G01B 11/00 |

OTHER PUBLICATIONS

Communication pursuant to Article 94(3) EPC of European Patent Application No. 16880907.7 from the European Patent office, dated May 26, 2021.

*Primary Examiner* — Hovhannes Baghdasaryan
(74) *Attorney, Agent, or Firm* — Arch & Lake LLP

(57) ABSTRACT

The present disclosure relates to a laser ranging device. The laser ranging device includes an encoded chassis, a rotary disc, a first barrier ring on the rotary disc and/or a second barrier ring on the encoded chassis. The encoded chassis includes a rotary bin and a plurality of ranging teeth disposed at intervals on the periphery of the rotary bin. The rotary disc is mounted within the encoded chassis and is rotatable within the rotary bin when the rotary disc is driven. The first barrier ring is disposed at the edge of the bottom surface of the rotary disc and the second barrier ring is disposed at the periphery of the ranging teeth, and the first barrier ring is located at the periphery of the ranging teeth after the rotary disc is mounted to the encoded chassis.

20 Claims, 3 Drawing Sheets

Related U.S. Application Data continuation of application No. PCT/CN2016/108937, filed on Dec. 7, 2016.

(51) Int. Cl.
    *G01D 5/347*     (2006.01)
    *G01S 7/48*     (2006.01)
    *G01S 17/48*     (2006.01)

(56) References Cited

U.S. PATENT DOCUMENTS

| | | | |
|---|---|---|---|
| 2015/0323669 A1* | 11/2015 | Lee | G01S 7/4813 356/3.11 |
| 2016/0279808 A1* | 9/2016 | Doughty | G01D 5/34738 |
| 2016/0290834 A1* | 10/2016 | Tang | G01D 5/3473 |
| 2016/0291158 A1* | 10/2016 | Tang | G01D 5/3473 |
| 2018/0003823 A1* | 1/2018 | Yan | G01S 7/4811 |

* cited by examiner

LASER RANGING DEVICE AND AUTOMATIC CLEANING DEVICE

CROSS-REFERENCE TO RELATED APPLICATION

This application is a continuation application of U.S. patent application Ser. No. 16/023,178, filed Jun. 29, 2018 which is based upon and claims priority to PCT International Application No. PCT/CN2016/108937 filed on Dec. 7, 2016, which claims the priority to Chinese patent application No. 201511021200.6, filed on Dec. 30, 2015, the entire contents of all of which are incorporated herein by reference in their entireties for all purposes.

TECHNICAL FIELD

The present disclosure relates to the field of laser technology, particularly to a laser ranging device which is waterproof and dustproof, and more particularly to a laser ranging device for an automatic cleaning device.

BACKGROUND

In old days, measurement of distance was made by rulers. However, it was a challenge to measure a long distance with a ruler. With the development of technology, ranging devices with laser has been developed.

As demand for multi-directional laser ranging measurement is increasing, rotation ranging method has been employed. However, sometimes, a laser ranging device may not be waterproof or dustproof, and accumulation of dust over time may block the view of the ranging component and cause the ranging component to fail in measurement or may reduce accuracy of measured data. In other cases, when water gets into the laser ranging device, water may drip onto the circuit board of the laser ranging device, resulting in short circuit and even burning the circuit board, such that the laser ranging device cannot work properly.

SUMMARY

The present disclosure provides laser ranging devices and a method of manufacturing a laser ranging device.

According to a first aspect of the present disclosure, a laser ranging device is provided. The laser ranging device may include: an encoded chassis comprising a rotary bin and a plurality of ranging teeth disposed at intervals on the periphery of the rotary bin; a rotary disc that is mounted within the encoded chassis and is rotatable within the rotary bin when the rotary disc is driven; and a first barrier ring disposed on the rotary disc; where the first barrier ring is disposed at the edge of the bottom surface of the rotary disc and is located at the periphery of the ranging teeth after the rotary disc is mounted to the encoded chassis According to a second aspect of the present disclosure, a laser ranging device is provided. The laser ranging device may include: an encoded chassis comprising a rotary bin and a plurality of ranging teeth disposed at intervals on the periphery of the rotary bin; a rotary disc that is mounted within the encoded chassis and is rotatable within the rotary bin when the rotary disc is driven; and a first barrier ring disposed on the encoded chassis and located at the periphery of the plurality of ranging teeth.

According to a third aspect of the present disclosure, a method of manufacturing a laser ranging device is provided. The method may include providing an encoded chassis that comprises a rotary bin and a plurality of ranging teeth disposed at intervals on the periphery of the rotary bin; providing a rotary disc that is mounted within the encoded chassis and is rotatable within the rotary bin when the rotary disc is driven; and providing a first barrier ring disposed on the rotary disc; where the first barrier ring is disposed at the edge of the bottom surface of the rotary disc and is located at the periphery of the ranging teeth after the rotary disc is mounted to the encoded chassis.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

The present disclosure will now be described in detail with reference to the examples shown in the accompanying drawings. However, these examples are not intended to limit the present disclosure. Modifications in structures, methods, or functions made by those skilled in the art in accordance with these examples fall within the scope of the present disclosure.

The terminology used in the present disclosure is only for the purpose of describing particular examples and is not intended to limit the present disclosure. Terms "a (an)", "said" and "the" in singular forms used in the present disclosure and the appended claims are also intended to include plural forms, unless the context clearly dictates otherwise. It also should be understood that the term "and/or" used herein refers to and encompasses any or all of the possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
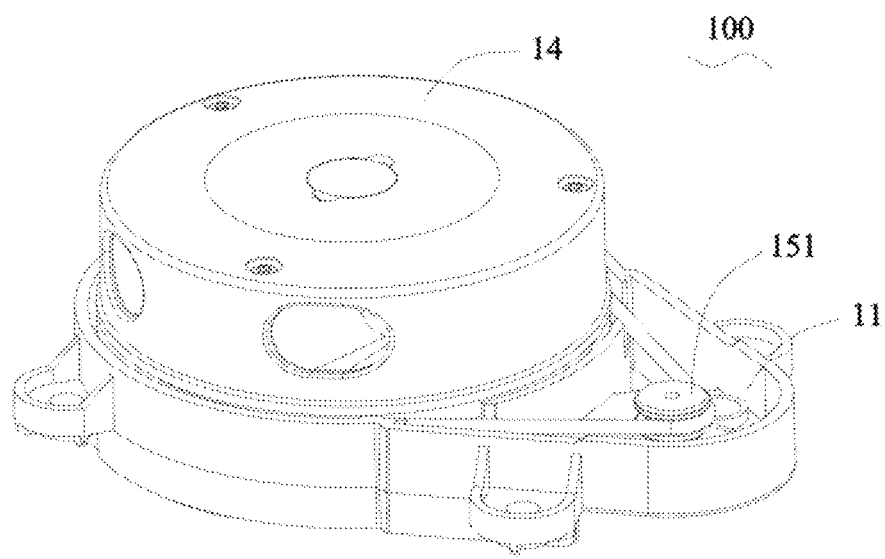
FIG. 1 is a schematic diagram illustrating an overall structure of a laser ranging device according to the present disclosure.
Figure 2:
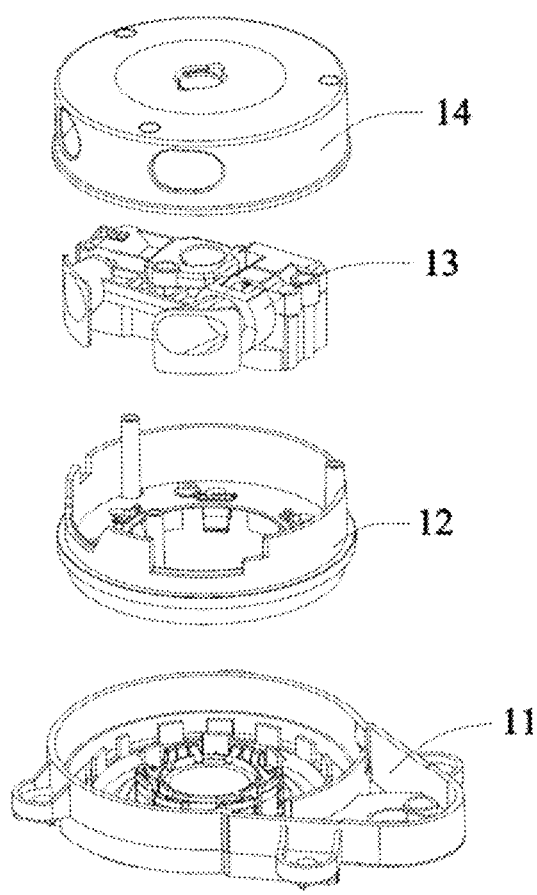
FIG. 2 is a schematic diagram illustrating decomposed structures of a laser ranging device according to the present disclosure.
Figure 3:
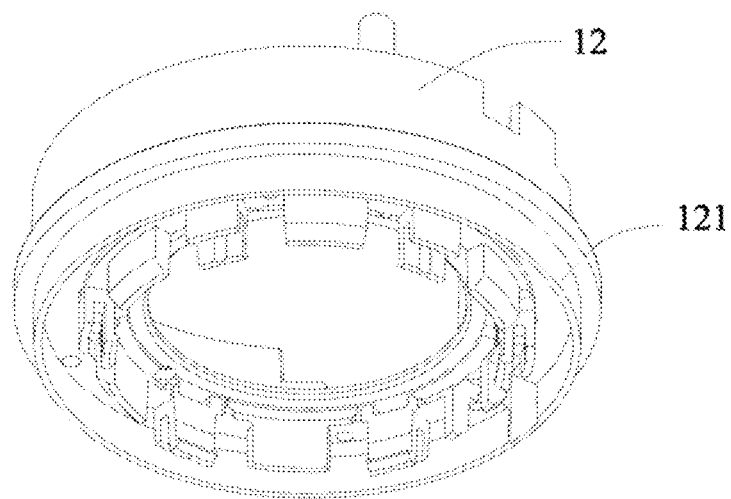
FIG. 3 is a schematic diagram illustrating a structure of a rotary disc in a laser ranging device according to the present disclosure.
Figure 4:
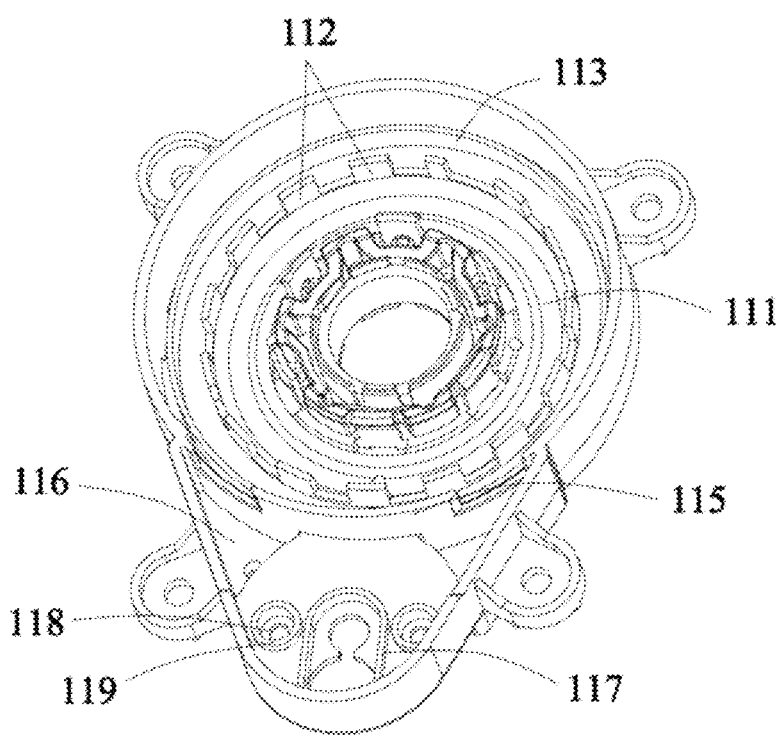
FIG. 4 is a schematic three-dimensional diagram illustrating an encoded chassis in a laser ranging device according to the present disclosure.

As shown in FIGS. 1 and 2, FIG. 1 is a schematic diagram illustrating an overall structure of a laser ranging device according to the present disclosure, and FIG. 2 is a schematic diagram illustrating decomposed structures of a laser ranging device according to the present disclosure. The laser ranging device 100 according to the present disclosure includes an encoded chassis 11, a rotary disc 12, a ranging component 13 and an upper cover 14. The encoded chassis 11 includes a rotary bin 111 thereon and a plurality of ranging teeth 112 disposed at intervals on the periphery of the rotary bin 111. Each of the ranging teeth 112 of the encoded chassis 11 may have a predetermine width and the distance between any two of the ranging teeth 112 may also be predetermined. Because of that, the encoded chassis 11 has a predetermined structure and may be considered encoded. The encoded chassis 11 has a disc that works with other discs like the rotary disc 12, the ranging component 13 and the upper cover 14 to achieve predetermined functions.

The ranging teeth 112 in cooperation with a pair of optocoupler elements in the ranging component 13 are configured to measure a rotation speed of the rotary disc 12. However, if the rotating optocoupler element is blocked by dust, an angular velocity of the LDS (semiconductor laser, a laser distance sensor) may not be measured, directly affecting the accuracy of the measured ranging data.

Then, the automatic cleaning device (also known as a sweeping robot) may fail to locate obstacles and cannot work properly. The rotary disc 12 is mounted within the encoded chassis 11, specifically mounted within the rotary bin 111 of the encoded chassis 11, and is rotatable within the rotary bin 111 when being driven. The ranging component 13 is mounted on the rotary disc 12 and is rotated with the rotary disc 12. The upper cover 14 is mounted on the encoded chassis 11 such that the rotary disc 12, the ranging component 13, the rotary bin 111 and other component are located between the upper cover 14 and the encoded chassis 11, so as to protect the components within the laser ranging device 100 and assist the dustproof and waterproof function.

Figure 5:
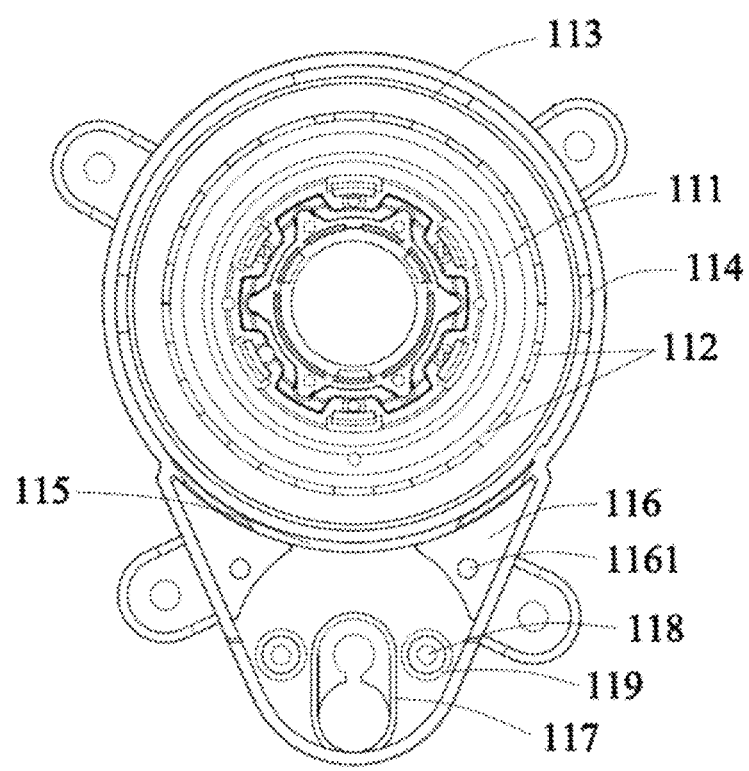
FIG. 5 is a top view of an encoded chassis in a laser ranging device according to the present disclosure.

A cordless power supply circuit board for the LDS is disposed below a central round hole of the encoded chassis 11 and the rotary disc 12. A fan circuit board is disposed below the LDS. If water drips onto the circuit boards, the circuit boards may be damaged immediately and require replacement. As shown in FIGS. 1 and 5, in an example of the present disclosure, in order to protect the circuit boards in the LDS, the laser ranging device 100 may include a first barrier ring 121 disposed on the rotary disc 12 and/or a second barrier ring 113 disposed on the encoded chassis 11. Specifically, when a first barrier ring 121 is disposed on the rotary disc 12, the first barrier ring 121 may be disposed at the edge of the bottom surface of the rotary disc 12. When a second barrier ring 113 is disposed on the encoded chassis 11, the second barrier ring 113 may be disposed on the periphery of the ranging teeth 112.

Further, the first barrier ring 121 is a protrusion on a side of the rotary disc 12 facing the encoded chassis 11. The first barrier ring 121 may be integrally formed with the rotary disc 12. After the rotary disc 12 is mounted on the encoded chassis 11, the first barrier ring 121 is located on the periphery of the ranging teeth 112 with a gap formed between the first barrier ring 121 and the encoded chassis 11, such that the rotary disc 12 does not interfere with the encoded chassis 11 when the rotary disc 12 is rotating. Preferably, the gap between the first barrier ring 121 and the encoded chassis 11 may be as small as possible such that the dustproof area may be increased. In addition, with the first barrier ring 121 extending from the rotary disc 12 to the encoded chassis 11, it may avoid water flowing into the encoded chassis 11 from the rotary disc 12. Instead, water may be guided by the first barrier ring 121 to the periphery of the encoded chassis 11, achieving a waterproof function.

The second barrier ring 113 is a protrusion on a side of the encoded chassis 11 facing the rotary disc 12. The protrusion may be integrally formed with the encoded chassis 11. A gap is formed between the second barrier ring 113 and the rotary disc 12. Preferably, the gap between the second barrier ring 113 and the rotary disc 12 may be as small as possible as long as the second barrier ring 113 does not interfere with the rotary disc 12 when the rotary disc 12 is rotating.

In an example of the present disclosure, both the first barrier ring 121 and the second barrier ring 113 are included, and after the rotary disc 12 is mounted on the encoded chassis 11, the second barrier ring 113 is positioned between the first barrier ring 121 and the ranging teeth 112. In the present example, projections of the first barrier ring 121 and the second barrier ring 113 on a vertical plane are partially overlapped. That is, the first barrier ring 121 and the second barrier ring 113 are partially overlapped such that S-shaped space is formed between the first barrier ring 121 and the second barrier ring 113, to completely solve the waterproof problem and improve the dustproof effect. In particular, since there is a gap between the first barrier ring 121 and the encoded chassis 11, there will be somehow a portion of dust and water getting into the rotary bin 111 of the encoded chassis 11. In this regard, a second barrier ring 113 is included, to compensate for the drawback of the gap between the first barrier ring 121 and the encoded chassis 11.

Preferably, the encoded chassis 11 also includes at least one slot 114 disposed thereon. The slot 114 may be disposed outside of the ranging teeth 112. Preferably the slot 114 is located at a position corresponding to the position on the encoded chassis 11 to which the outer edge of the first barrier ring 121 extends. With this configuration, the dust or water blocked by the first barrier ring 121 may fall to the slot 114, and eventually fall outside from the bottom surface of the encoded chassis 11 through the slot 114, to prevent accumulation of dust and water. In an example, a plurality of slots 114 are provided in the encoded chassis 11 and distributed evenly in the position on the encoded chassis 11 to which the outer edge of the first barrier ring 121 extends. In an example, a first water guidance protrusion (not shown in the figure) is disposed at the position on the encoded chassis 11 facing away from the slot 114 (i.e., the position on the bottom surface of the encoded chassis 11 corresponding to the slot 114). The first water guidance protrusion is configured to guide water and dust to flow downward, to avoid water flowing to other positions and causing water leakage for the circuit boards.

The laser ranging device 100 also includes a driving means 15 disposed adjacent to the rotary disc 12 to drive the rotary disc 12 to rotate. In an example of the present disclosure, the driving means 15 is a servo motor mounted on the bottom surface of the encoded chassis 11 with the drive shaft of the driving means 15 running through the encoded chassis 11. Above the encoded chassis 11, a transmission wheel 151 is mounted on the drive shaft, together with a conveyor belt mounted to the transmission wheel 151 and the rotary disc 12, are configured to drive the rotary disc 12 to rotate. The encoded chassis 11 also includes a drive bin adjacent to the rotary bin 111. The transmission wheel 151 is located in the drive bin. The servo motor is mounted below the drive bin such that the space within the laser ranging device 100 may be utilized reasonably.

The encoded chassis 11 also includes thereon a water-dust-proof wall 115 disposed between the rotary bin 111 and the drive bin. The water-dust-proof wall 115 separates the rotary bin 111 from the drive bin to prevent water dripping into the drive bin from flowing into the rotary bin 111. Moreover, the water-dust-proof wall 115 may function to prevent dust from being transferred to the rotary bin 111 from the drive bin. The water-dust-proof wall 115 may be a protrusion extending upward from the surface of the encoded chassis 11.

Further, the encoded chassis 11 may also include a recess 116 adjacent to the water-dust-proof wall 115. The recess 116 and the rotary bin 111 are located respectively at two sides of the water-dust-proof wall 115. In the present disclosure, two recesses 116 are provided, and respectively located at the waist portion of the encoded chassis 11 between the rotary bin 111 and the drive bin. A guidance hole 1161 is provided on the bottom surface of the recess 116. The recess 116 is configured to collect dust, and dust around the recess 116 may all be guided into the recess 116, to reduce the amount of dust entering into the rotary bin 111. The guidance hole 1161 on the bottom surface of the recess 116 may allow a portion of dust to be discharged from the guide hole 1161. In addition, the recess 116 may also be configured to collect water, prevent dust and discharge water.

The water collecting function is mainly implemented by a water collection space formed by the first barrier ring 121 and water-dust-proof wall 115. The dust proof function is mainly implemented in that, the outer edge of the first barrier ring 121 and the upper edge of the water-dust-proof wall 115 form a slit that causes the path of the dust entering with wind to be changed downward by the first barrier ring 121, to significantly reduce the amount of entering dust. In addition, then the second barrier ring 113 may be included to bring the wind with dust to an additional path from bottom to top, to further reduce the amount of dust. With guidance of other components, a portion of the water dripping on the laser ranging device 100 may be guided into the recess 116. The recess 116 allows water to flow out of the laser ranging device 100 through the guide hole 1161. Also, the water flowing out may bring dust to flow out of the laser ranging device 100 together with it.

Preferably, the encoded chassis 11 also includes a second water guidance protrusion (not shown in the figure) disposed on the bottom surface of the encoded chassis 11 and corresponding to the guide hole 1161. The second water guidance protrusion serves to guide the drainage, and prevent water flowing from above the encoded chassis 11 from being guided by the bottom surface of the encoded chassis 11 to the main circuit board under the LDS in the host machine and damaging the main circuit board, and from being guided to the driving means 15 and damaging the driving means 15. The water guidance protrusion is formed by the bottom surface of the encoded chassis 11 extending downward. There is a gap between the water guidance protrusion and the driving means 15, such that water flowing out of the water guidance protrusion will not drip onto the driving means 15. In the present example, the water above the encoded chassis 11 flows to the bottom surface of the encoded chassis 11 through the guide hole 1161, and drips outside through the water guidance protrusion, thereby preventing the dripping water from flowing to other places.

Further, the encoded chassis 11 also includes thereon a third barrier ring 117 disposed on the circumference of the drive shaft. The third barrier ring 117 is disposed below the transmission wheel, in order to protect the driving means 15, and avoid water flowing downward through the hole penetrating the drive draft on the encoded chassis 11 and dripping onto the driving means 15, thereby causing damage to the drive means 15. In addition, the encoded chassis 11 also includes thereon a connecting portion 118 for connection to the driving means 15. A waterproof protrusion 119 is disposed on the circumference of the connecting portion 118. For example, in an example of the present disclosure, the driving means 15 is screwed to the encoded chassis 11, and a threaded hole is provided in the encoded chassis 11 correspondingly. Therefore, after water gets into the laser ranging device 100, water may drip from the threaded hole and directly drip onto the driving means 15, probably causing the driving means 15 to be short-circuited. In this regard, a waterproof projection 119 is provided on the circumference of the threaded hole. However, the connecting portion in the present disclosure is not limited to the threaded hole, but may also be a connecting portion of other structure. The waterproof projection 119 is provided to prevent water from entering from the connecting portion 118.

In still another aspect of an example of the present disclosure, there is also provided an automatic cleaning device including a machine body and a laser ranging device as described above. The laser ranging device is provided in the machine body, and the automatic cleaning device may have a dustproof and waterproof effect due to the dustproof and waterproof function of the laser ranging device.

In the laser ranging device and the automatic cleaning device according to the present disclosure, by providing a plurality of water-dust-proof walls, dust water storage chambers and water guidance protrusions to the laser ranging device, it may block dust and prevent water from entering, and achieve an effect of protecting the components in the laser ranging device. Therefore, it may prolong the service life of the laser ranging device, and may avoid the accuracy of the ranging data being affected by the accumulation of dust.

The present disclosure provides a laser ranging device and an automatic cleaning device, which has waterproof and dustproof design.

According to a first aspect of the examples of the present disclosure, there is provided a laser ranging device, including:

an encoded chassis including a rotary bin and a plurality of ranging teeth disposed at intervals on the periphery of the rotary bin, a rotary disc mounted within the encoded chassis and rotatable within the rotary bin when being driven; and a first barrier ring disposed on the rotary disc;

wherein the first barrier ring is disposed at the edge of the bottom surface of the rotary disc and located at the periphery of the ranging teeth after the rotary disc is mounted to the encoded chassis.

Optionally, the laser ranging device further includes a first barrier ring and a second barrier ring, wherein the second barrier ring is disposed on the periphery of the ranging teeth and located between the first barrier ring and the ranging teeth after the rotary disc is mounted to the encoded chassis.

Optionally, projections of the first barrier ring and the second barrier ring on a vertical plane are partially overlapped.

Optionally, a gap exists between the first barrier ring and the encoded chassis, and a gap exists between the second barrier ring and the rotary disc.

Optionally, the encoded chassis further includes at least one slot disposed thereon, and the slot is disposed on outer edge of the ranging teeth.

Optionally, the encoded chassis further includes a first water guidance protrusion disposed at a position on the bottom surface of the encoded chassis corresponding to the slot.

Optionally, the encoded chassis further includes a drive bin adjacent to the rotary bin, and the encoded chassis further includes thereon a water-dust-proof wall disposed between the rotary bin and the drive bin.

Optionally, the encoded chassis further includes a recess adjacent to the water-dust-proof wall, the recess and the rotary bin are located respectively at two sides of the water-dust-proof wall, and a guidance hole is provided on the bottom surface of the recess.

Optionally, the encoded chassis further includes a second water guidance protrusion disposed on the bottom surface of the encoded chassis and corresponding to the guide hole.

Optionally, the laser ranging device further includes: a driving means disposed on the bottom surface of the encoded chassis with a drive shaft of the driving means running through the encoded chassis, wherein the encoded chassis further comprises thereon a third barrier ring disposed on the circumference of the drive shaft.

Optionally, the encoded chassis further includes thereon a connecting portion for connection to the driving means, and a waterproof protrusion is disposed on the circumference of the connecting portion.

Optionally, the laser ranging device further includes: a ranging component mounted to the rotary disc and an upper cover mounted on the encoded chassis, wherein the rotary disc and the ranging component are located between the upper cover and the encoded chassis.

According to a second aspect of the examples of the present disclosure, there is provided an automatic cleaning device, including a machine body and the laser ranging device according to the above, which is provided in the machine body.

According to a third aspect of the examples of the present disclosure, there is provided a laser ranging device, including:

an encoded chassis including a rotary bin and a plurality of ranging teeth disposed at intervals on the periphery of the rotary bin, a rotary disc mounted within the encoded chassis and rotatable within the rotary bin when being driven; and a first barrier ring disposed on the encoded chassis and located at the periphery of the plurality of ranging teeth.

Optionally, the laser ranging device further includes a second barrier ring disposed on the edge of the bottom surface of the rotary disc, wherein the first barrier ring is located between the second barrier ring and the ranging teeth after the rotary disc is mounted to the encoded chassis.

Optionally, projections of the first barrier ring and the second barrier ring on a vertical plane are partially overlapped.

Optionally, a gap exists between the second barrier ring and the encoded chassis, and a gap exists between the first barrier ring and the rotary disc.

Optionally, the encoded chassis further includes at least one slot disposed thereon, and the slot is disposed outside of the ranging teeth.

Optionally, the encoded chassis further includes a first water guidance protrusion disposed at a position on the bottom surface of the encoded chassis corresponding to the slot.

Optionally, the encoded chassis further includes a drive bin adjacent to the rotary bin, and the encoded chassis further includes thereon a water-dust-proof wall disposed between the rotary bin and the drive bin.

Optionally, the encoded chassis further includes a recess adjacent to the water-dust-proof wall, the recess and the rotary bin are located respectively at two sides of the water-dust-proof wall, and a guidance hole is provided on the bottom surface of the recess.

Optionally, the encoded chassis further includes a second water guidance protrusion disposed on the bottom surface of the encoded chassis and corresponding to the guide hole.

Optionally, the laser ranging device further includes: a driving means disposed on the bottom surface of the encoded chassis with a drive shaft of the driving means running through the encoded chassis, wherein the encoded chassis further comprises thereon a third barrier ring disposed on the circumference of the drive shaft.

Optionally, the encoded chassis further includes thereon a connecting portion for connection to the driving means, and a waterproof protrusion is disposed on the circumference of the connecting portion.

Optionally, the laser ranging device further includes a ranging component mounted to the rotary disc and an upper cover mounted on the encoded chassis, wherein the rotary disc and the ranging component are located between the upper cover and the encoded chassis.

According to a fourth aspect of the examples of the present disclosure, there is provided an automatic cleaning device, including a machine body and the laser ranging device according to above, which is provided in the machine body.

The technical solutions provided by the examples of the present disclosure may have the following advantageous effects. In the laser ranging device and the automatic cleaning device according to the present disclosure, by providing a plurality of water-dust-proof walls, dust water storage chambers and water guidance protrusions to the laser ranging device, it may block dust and prevent water from entering, and achieve an effect of protecting the components in the laser ranging device. Therefore, it may prolong the service life of the laser ranging device.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof.

The invention claimed is:

1. A laser ranging device, comprising:
   an encoded chassis comprising a rotary bin and a plurality of ranging teeth disposed at intervals on the periphery of the rotary bin;
   a rotary disc that is mounted within the encoded chassis and is rotatable within the rotary bin when the rotary disc is driven; and
   a first barrier ring disposed on the rotary disc;
   wherein the first barrier ring is disposed at the edge of the bottom surface of the rotary disc and is located at the periphery of the ranging teeth after the rotary disc is mounted to the encoded chassis.

2. The laser ranging device according to claim 1, further comprising a second barrier ring that is disposed on the periphery of the ranging teeth and is located between the first barrier ring and the ranging teeth after the rotary disc is mounted to the encoded chassis.

3. The laser ranging device according to claim 2, wherein projections of the first barrier ring and the second barrier ring on a vertical plane are at least partially overlapped.

4. The laser ranging device according to claim 3, wherein a first gap exists between the first barrier ring and the encoded chassis, and a second gap exists between the second barrier ring and the rotary disc.

5. The laser ranging device according to claim 1, wherein the encoded chassis further comprises at least one slot disposed thereon, and the at least one slot is disposed outside of the ranging teeth.

6. The laser ranging device according to claim 5, wherein the encoded chassis further comprises a first water guidance protrusion disposed at a position on the bottom surface of the encoded chassis corresponding to the at least one slot.

7. The laser ranging device according to claim 1, wherein the encoded chassis further comprises a drive bin adjacent to the rotary bin, and the encoded chassis further comprises thereon a water-dust-proof wall disposed between the rotary bin and the drive bin.

8. The laser ranging device according to claim 7, wherein the encoded chassis further comprises a recess adjacent to the water-dust-proof wall, the recess and the rotary bin are located respectively at two sides of the water-dust-proof wall, and a guidance hole exists on the bottom surface of the recess.

9. The laser ranging device according to claim 1, wherein the first barrier ring extends from the rotary disc to the encoded chassis, to guide water to a periphery of the encoded chassis.

10. The laser ranging device according to claim 1, further comprising:
    a driving means disposed on the bottom surface of the encoded chassis with a drive shaft of the driving means running through the encoded chassis, wherein the encoded chassis further comprises thereon a third barrier ring disposed on the circumference of the drive shaft.

11. The laser ranging device according to claim 10, wherein the encoded chassis further comprises thereon a connecting portion for connecting the encoded chassis to the driving means, and a waterproof protrusion is disposed on the circumference of the connecting portion.

12. The laser ranging device according to claim 1, further comprising a ranging component mounted to the rotary disc and an upper cover mounted on the encoded chassis, wherein the rotary disc and the ranging component are located between the upper cover and the encoded chassis.

13. An automatic cleaning device, comprising the laser ranging device according to claim 1, which is provided in a machine body.

14. A laser ranging device, comprising:
    an encoded chassis comprising a rotary bin and a plurality of ranging teeth disposed at intervals on the periphery of the rotary bin;
    a rotary disc that is mounted within the encoded chassis and is rotatable within the rotary bin when the rotary disc is driven; and
    a first barrier ring disposed on the encoded chassis and located at the periphery of the plurality of ranging teeth.

15. The laser ranging device according to claim 14, further comprising a second barrier ring disposed on the edge of the bottom surface of the rotary disc, wherein the first barrier ring is located between the second barrier ring and the ranging teeth after the rotary disc is mounted to the encoded chassis.

16. The laser ranging device according to claim 15, wherein projections of the first barrier ring and the second barrier ring on a vertical plane are at least partially overlapped.

17. The laser ranging device according to claim 16, wherein a first gap exists between the second barrier ring and the encoded chassis, and a second gap exists between the first barrier ring and the rotary disc.

18. The laser ranging device according to claim 14, wherein the encoded chassis further comprises at least one slot disposed thereon, and the at least one slot is disposed outside of the ranging teeth.

19. The laser ranging device according to claim 18, wherein the encoded chassis further comprises a first water guidance protrusion disposed at a position on the bottom surface of the encoded chassis corresponding to the at least one slot.

20. A method of manufacturing a laser ranging device, comprising:
    providing an encoded chassis that comprises a rotary bin and a plurality of ranging teeth disposed at intervals on the periphery of the rotary bin;
    providing a rotary disc that is mounted within the encoded chassis and is rotatable within the rotary bin when the rotary disc is driven; and
    providing a first barrier ring disposed on the rotary disc;
    wherein the first barrier ring is disposed at the edge of the bottom surface of the rotary disc and is located at the periphery of the ranging teeth after the rotary disc is mounted to the encoded chassis.

* * * * *